US011756145B2

(12) United States Patent
Semple (10) Patent No.: US 11,756,145 B2
(45) Date of Patent: Sep. 12, 2023

(54) SYSTEMS AND METHODS FOR PROVIDING A UNIFIED TRANSPORTATION SERVICE

(71) Applicant: Ford Global Technologies, LLC, Dearborn, MI (US)

(72) Inventor: Carlton Semple, Burlingame, CA (US)

(73) Assignee: Ford Global Technologies, LLC

( * ) Notice: Subject to any disclaimer, the term of this patent is extended or adjusted under 35 U.S.C. 154(b) by 214 days.

(21) Appl. No.: 16/933,021

(22) Filed: Jul. 20, 2020

(65) Prior Publication Data
US 2022/0020105 A1   Jan. 20, 2022

(51) Int. Cl.
| | |
|---|---|
| *G06Q 10/02* | (2012.01) |
| *G06Q 50/30* | (2012.01) |
| *G01C 21/34* | (2006.01) |
| *H04W 12/50* | (2021.01) |

(52) U.S. Cl.
CPC ......... *G06Q 50/30* (2013.01); *G01C 21/3415* (2013.01); *G01C 21/3423* (2013.01); *G01C 21/3438* (2013.01); *G06Q 10/02* (2013.01); *H04W 12/50* (2021.01)

(58) Field of Classification Search
CPC ....... G06Q 50/30; G06Q 10/02; H04W 12/50; G01C 21/3415; G01C 21/3423; G01C 21/3438
See application file for complete search history.

(56) References Cited

U.S. PATENT DOCUMENTS

| | | |
|---|---|---|
| 9,212,924 B1 | 12/2015 | Salowitz |
| 9,880,014 B2 | 1/2018 | Tang et al. |
| 2005/0004757 A1 | 1/2005 | Neeman et al. |

(Continued)

OTHER PUBLICATIONS

J. Lin, S. Sasidharan, S. Ma and O. Wolfson, "A Model of Multimodal Ridesharing and Its Analysis," 2016 17th IEEE International Conference on Mobile Data Management (MDM), Porto, Portugal, 2016, pp. 164-173, doi: 10.1109/MDM.2016.34. (Year: 2016).*

(Continued)

*Primary Examiner* — Jeff Zimmerman
*Assistant Examiner* — Wayne S. Murray
(74) *Attorney, Agent, or Firm* — Brandon Hicks; Eversheds Sutherland (US) LLP (57) ABSTRACT

The disclosure pertains to providing a unified transportation service by use of a primary vehicle and secondary vehicles that are transported in the primary vehicle. In an exemplary method, a passenger uses an application provided in a smartphone to enter a trip destination. The smartphone may then be paired with a smartphone carried by a driver of the primary vehicle. The driver's smartphone tracks the movement of the primary vehicle towards the trip destination. Various factors, such as traffic delays or congestion, may occur enroute. If so, the primary vehicle stops at an intermediate location and the application in the passenger's smartphone automatically offers the passenger, the use of a secondary vehicle. If the offer is accepted, the passenger's smartphone is paired with an identification tag attached to an assigned secondary vehicle and the passenger may remove the secondary vehicle from the primary vehicle for travelling to his/her trip destination.

20 Claims, 6 Drawing Sheets

(56) References Cited

U.S. PATENT DOCUMENTS

| | | | |
|---|---|---|---|
| 2008/0038054 A1 | 2/2008 | Gustafson | |
| 2012/0196631 A1* | 8/2012 | Fajstrup Axelsen | G06Q 20/3278 340/5.5 |
| 2015/0074004 A1* | 3/2015 | Song | G07C 9/00896 705/307 |
| 2016/0332535 A1* | 11/2016 | Bradley | G08B 21/24 |
| 2017/0191845 A1* | 7/2017 | Marueli | G01C 21/20 |
| 2019/0376801 A1* | 12/2019 | Whitt | G07C 5/004 |
| 2020/0111268 A1* | 4/2020 | Montague | G07B 15/02 |
| 2022/0044344 A1* | 2/2022 | Ramot | G06Q 10/047 |

OTHER PUBLICATIONS

"Urban Mobility: Getting Around Stress-Free," Kathrin Wildemann, Dec. 7, 2017; Web page <https://www.zf.com/mobile/en/stories_3139.html>, 6 pages, retrieved from the internet on Oct. 19, 2020.

* cited by examiner

FIG. 6

SYSTEMS AND METHODS FOR PROVIDING A UNIFIED TRANSPORTATION SERVICE

FIELD OF THE DISCLOSURE

This disclosure generally relates to vehicles, and more particularly relates to systems and methods for using vehicles to provide transportation services.

BACKGROUND

Traffic congestion is a major issue in many urban areas and can cause various problems such as traffic accidents, fatalities, and air pollution. Various solutions have been proposed to address this issue. For example, some cities have created car-free zones so as to encourage people to forgo use of personal vehicles and seek other forms of transport, such as public buses, bicycles, and walking. Another solution involves the use of ride sharing services. Ride-sharing services are typically directed at transporting several people in one vehicle to reduce the number of vehicles used on roads. However, many people find it inconvenient and/or expensive to utilize ride-sharing services or public transport and instead opt to use their personal vehicles. Unlike ride-share vehicles that can drop off passengers at various locations and head out to provide ride services to other customers, many people find it desirable to park a personal vehicle at a convenient spot where an owner of the personal vehicle can access the vehicle by foot. However, finding a convenient spot to park the vehicle can turn out to be a problem, particularly in congested areas of a city.

Consequently, people tend to cruise around looking for a suitable parking spot based on various factors, such as location of the parking spot and parking fees applied for use of the parking spot. Such activities fail to reduce traffic congestion and may also prevent ride-share service vehicles from reaching their destinations, such as an office building located in a downtown area, without wasting time stopped in heavy traffic or in an engine-idling condition that causes pollution. It is therefore desirable to provide solutions that allow a vehicle, particularly a ride-share vehicle, to avoid the need to travel all the way to each of various destinations desired by one or more passengers of the vehicle.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In terms of a general overview, this disclosure is generally directed to systems and methods for providing a unified transportation service using a primary vehicle and one or more secondary vehicles that are transported in the primary vehicle. In an exemplary method in accordance with the disclosure, a passenger of the primary vehicle enters a trip destination into a communication device, such as by using an application provided in a smartphone. The smartphone may be paired with another smartphone carried by a driver of the primary vehicle or with a computer provided in the primary vehicle. The driver's smartphone and/or the computer may be used to track the vehicle as the vehicle travels towards the trip destination. One or more of various factors may cause the vehicle to be stopped enroute at an intermediate location. Some exemplary factors that may cause such a stoppage may include factors such as traffic congestion, travel delay, reaching a geo-fence of a car-free zone, or a request originated by the passenger. The application in the passenger's smartphone passenger automatically offers the passenger the use of an assigned secondary vehicle (a scooter, for example) to reach his/her trip destination. If the offer is accepted, the passenger's smartphone is paired with an identification tag attached to the assigned secondary vehicle and the passenger may remove the secondary vehicle from the primary vehicle for use to travel to the trip destination. The driver's smartphone (or the computer in the autonomous vehicle) executes various tasks such as assigning of the secondary vehicle and keeping track of the inventory of the secondary vehicles transported in the primary vehicle.

Illustrative Embodiments

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

Furthermore, certain words and phrases that are used herein should be interpreted as referring to various objects and actions that are generally understood in various forms and equivalencies by persons of ordinary skill in the art. For example, the word "vehicle" as used herein can pertain to any of various types of vehicles such as, for example, a gasoline driven vehicle, an electric vehicle, a hybrid vehicle, an autonomous vehicle, a car, a van, a camper, a recreational vehicle, a vehicle attached to a trailer, and a bus. The phrase "ride-share vehicle" as used herein refers to any vehicle that is used to transport multiple passengers. In some cases, the passengers may not know each other such as when the ride-share vehicle is operated by a ride-share service such as Uber® or Lyft® or when the passengers are a part of a tour group riding a bus. In some other cases, the passengers may know each other, such as family members traveling in a van, or a church group traveling in a bus. In yet some other cases, the passengers may be colleagues at a work place. It should be understood that the phrase "communication device" as used herein is not limited to a smartphone, and can also refer to various other devices such as, for example, a laptop computer, a tablet computer, a personal digital assistant (PDA), and a phablet (phone plus tablet). The phrase "unified transportation service" as used herein refers to an arrangement where a passenger can use a communication device to specify a trip destination and the system automatically provides a beginning-to-end travel arrangement involving multiple travel segments and a primary vehicle that transports one or more secondary vehicles. Such an arrangement enables the passenger to reach his/her destination without having to seek, reserve, or worry about finding vehicles for completing individual segments of the trip. The "unified" approach in accordance with the disclosure is in contrast to a conventional approach where a passenger who takes a train to travel to a first location has to then take steps to find a taxi to reach his/her final destination. Finding a taxi may be especially undesirable under adverse circumstances such as traffic congestion, traffic delays, and restricted availability as a result of high demand from other people looking for taxis.

Figure 1:
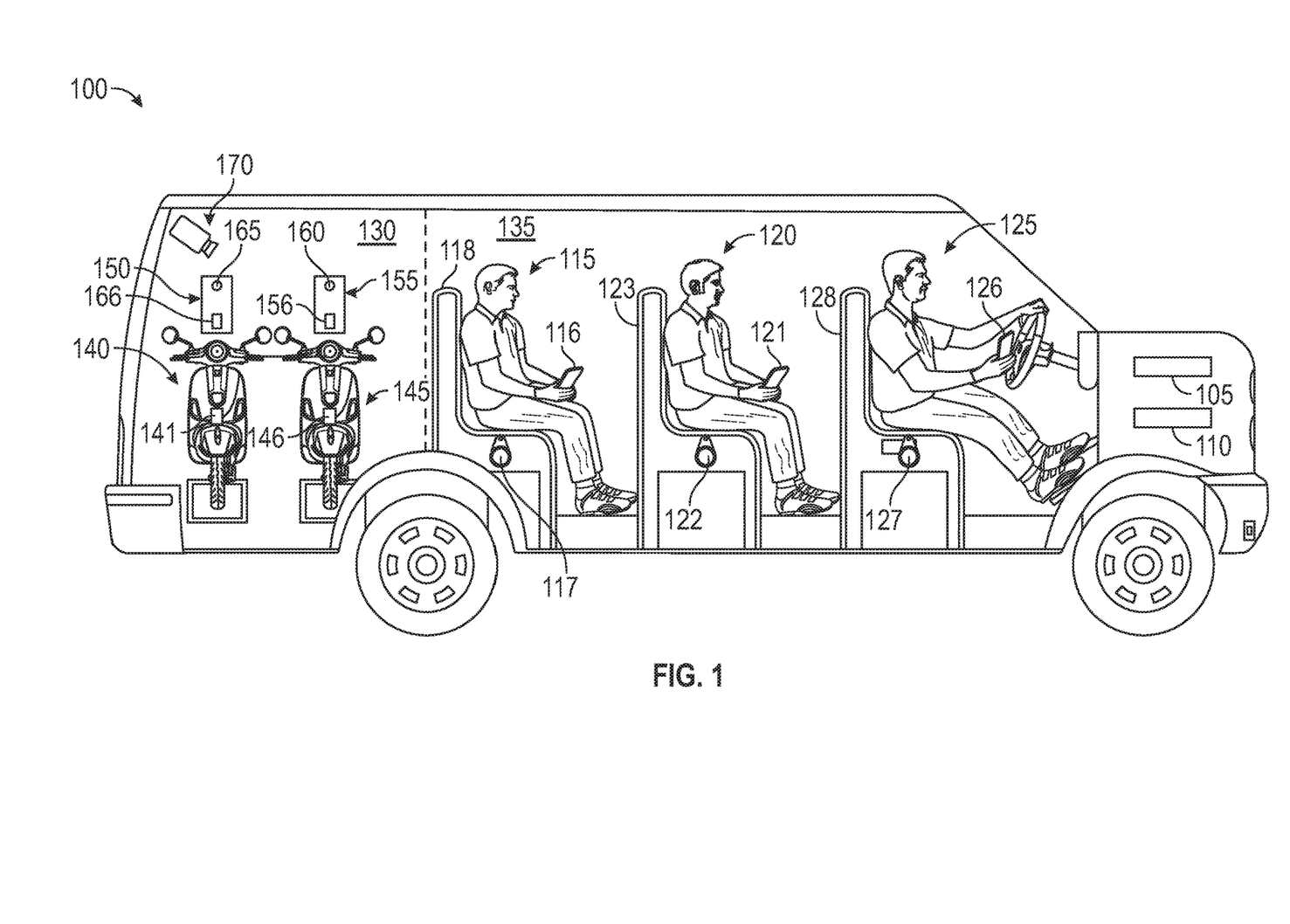
FIG. 1 shows an exemplary vehicle that provides unified transportation service in accordance with an embodiment of the disclosure.

FIG. 1 shows an exemplary vehicle 100 that provides a unified transportation service in accordance with an embodiment of the disclosure. The vehicle 100 may be one of various types of vehicles such as a gasoline powered vehicle, an electric vehicle, a hybrid electric vehicle, or an autonomous vehicle, and can include various items such as a vehicle computer 105, an auxiliary operations computer 110, and an imaging device 170.

The vehicle computer 105 may perform various functions such as controlling engine operations (fuel injection, speed control, emissions control, braking, etc.), managing climate controls (air conditioning, heating etc.), activating airbags, and issuing warnings (check engine light, bulb failure, low tire pressure, vehicle in blind spot, etc.).

The auxiliary operations computer 110 may be used to support various operations in accordance with the disclosure. In some cases, some or all of the components of the auxiliary operations computer 110 may be integrated into the vehicle computer 105. Accordingly, various operations in accordance with the disclosure may be executed by the auxiliary operations computer 110 in an independent manner. For example, the auxiliary operations computer 110 may carry out some operations such as pairing with one or more smartphones carried by passengers in the vehicle 100, tracking a movement of the vehicle 100, and/or executing an inventory function.

In the illustration shown in FIG. 1, the vehicle 100 is a ride-share vehicle that includes a driver 125, a first passenger 115, and a second passenger 120 seated in a seating area 135. In other cases, more than, or less than, two passengers may occupy the vehicle 100. The driver 125, the first passenger 115, and the second passenger 120, may each have a communications device that can be used to perform various operations in accordance with the disclosure. For example, the first passenger 115 may have a smartphone 116 that contains an application for requesting a unified transportation service, and for receiving instructions associated with the unified transportation service provided by the vehicle 100. The second passenger 120 may have a smartphone 121 that also contains a similar application. The driver 125 may have a smartphone 126 containing one or more applications that can assist the driver 125 execute various operations in accordance with the disclosure.

The first passenger 115 may sit in a seat 118. A communication tag 117 that is attached to the seat 118 may be used to communicate with the smartphone 116 and/or the smartphone 126 for various purposes such as for determining whether the first passenger 115 is occupying the seat 118. The communication tag 117 can be a near field communication (NFC) device, a radio frequency identification (RFID) tag, or any other identification device that can be used for communications with the smartphone 126. Verifying that the first passenger 115 is occupying the seat 118 may assist the smartphone 126 and/or the driver 125 to make a determination whether there are enough number of secondary vehicles available for use during a trip.

A communication tag 122 that may be substantially similar to the communication tag 117, is attached to the seat 123 and may be used to communicate with the smartphone 121 of the second passenger 120 and/or the smartphone 126 of the driver 125 for purposes such as determining whether the second passenger 120 is occupying the seat 123.

Another communication tag 127 that may be substantially similar to the communication tag 117, is attached to a seat 128 and may be used to communicate with the smartphone 126 for various purposes such as determining whether the driver 125 is occupying the seat 128. Verifying that the driver 125 is occupying the seat 128 may assist the smartphone 126 to make a determination whether the vehicle 100 is ready to start on a journey.

The vehicle 100, which can be referred to as a primary vehicle, includes a storage area 130 where multiple secondary vehicles can be stored. In this example, two secondary vehicles—a secondary vehicle 140 and a secondary vehicle 145, are stored in the storage area 130. In other cases, more than, or less than, two secondary vehicles may be stored in the storage area 130.

Each of the secondary vehicle 140 and the secondary vehicle 145 can be any type of personal transportation vehicle such as, for example, a scooter, a bicycle, a Segway®, or a skateboard. Each of the secondary vehicles can be placed in an upright, folded, or reclining position in a respective dock in the storage area 130.

For example, the secondary vehicle 140 can be stored in a dock 150 that includes a light emitting element 165. The light emitting element 165, which can be an element such as a light emitting diode (LED) provides a visual indication about one or more parameters pertaining to the secondary vehicle 140. A few exemplary parameters may include a status indication whether the secondary vehicle 140 is currently docked in the dock 150, a status indication whether the secondary vehicle 140 has been removed from the dock 150, a status indication whether the secondary vehicle 140 is available for use, and a status indication whether the secondary vehicle 140 has been assigned for use by a passenger. An occupant of the vehicle 100, such as the driver 125 or the first passenger 115, can obtain such information merely by looking at the light emitting element 165.

The dock 155 may further include a communication device 166 that can communicate with various devices in the vehicle 100. For example, the communication device 166 can communicate with the auxiliary operations computer 110, the smartphone 126 carried by the driver 125, the smartphone 116 carried by the first passenger 115, and/or the smartphone 121 carried by the second passenger 120. The communication device 166 may transmit and/or receive various types of messages related to the secondary vehicle 140. For example, the communication device 166 may transmit a message to the smartphone 116 that informs the first passenger 115 of an assignment of the secondary vehicle 140 to the first passenger 115, a message that provides instructions on how to unload the secondary vehicle 140 from the vehicle 100, and/or a message that provides instructions on how to use or operate the secondary vehicle 140. In some cases, such messages may be transmitted to the smartphone 116 by the auxiliary operations computer 110 instead of, or in addition to, the communication device 166.

An identification tag 141 may be attached to the secondary vehicle 140. In one exemplary case, the identification tag 141 is an NFC tag that can wirelessly communicate with various devices such as the communication device 166 and the various smartphones present in the vehicle 100, for uniquely identifying the secondary vehicle 140. In another exemplary case, the identification tag 141 may include a bar code (such as a QR code, for example) that can be read by a smartphone.

The secondary vehicle 145 is stored in a dock 155 that includes a light emitting element 160 which operates substantially similar to the light emitting element 165. The dock 155 may further include a communication device 156 which operates substantially similar to the communication device 166. An identification tag 146 that is similar to the identification tag 141 may be attached to the secondary vehicle 140.

The storage area 130 of the vehicle 100 may also have an imaging device 170, such as, for example, a video camera or a digital camera. The imaging device 170 is arranged to capture images of the docks and/or the secondary vehicles. The images may be transmitted to the auxiliary operations computer 110 in order to obtain various types of information. For example, the images may be processed by the auxiliary operations computer 110 to examine the light emitting elements and obtain a status of the secondary vehicles. The images may also be used by the auxiliary operations computer 110 and/or the driver of the vehicle 100 (via the smartphone 126) to observe activities associated with the secondary vehicles, such as a removal of the secondary vehicle 140 from the dock 150 and/or from the vehicle 100.

Figure 2:
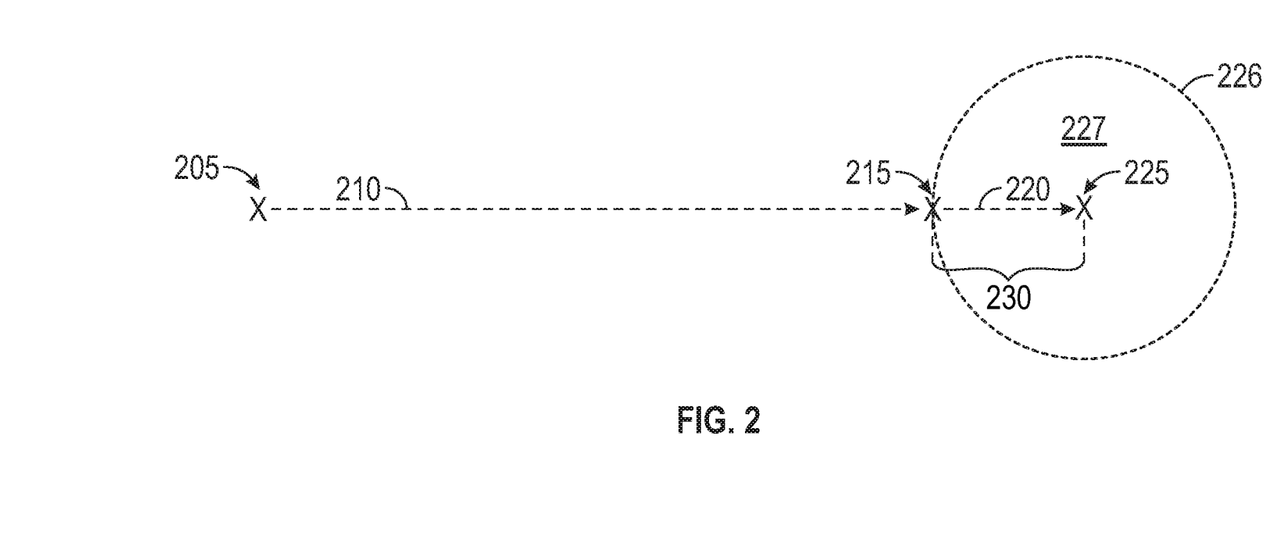
FIG. 2 shows an exemplary diagram of travel segments associated with a unified transportation service in accordance with the disclosure.

FIG. 2 shows an exemplary diagram of travel segments that may be associated with a unified transportation service in accordance with the disclosure. In this exemplary case, there are two travel segments. In other cases, there can be more than two travels segments, one or more of which may be traversed by the primary vehicle (vehicle 0100) and others by the secondary vehicles. The two travel segments include a first travel segment 210 that extends from a starting location 205 to an intermediate location 215 and a second travel segment 220 that extends from the intermediate location 215 to a trip destination 225 that is designated by a passenger of the vehicle 100, such as, for example, the first passenger 115.

In an exemplary method of operation in accordance with the disclosure, the first passenger 115 uses an application loaded on the smartphone 116 to initiate a ride request for obtaining a ride in the vehicle 100, which may be a rideshare vehicle such as one provided by Uber® or Lyft®. The ride request may be made either before, or after, boarding the vehicle 100. More particularly, the first passenger 115 uses the ride request includes the trip destination 225.

The vehicle 100 may service the ride request by starting from the starting location 205 towards the trip destination 225 along the first travel segment 210. It must be understood that the first travel segment 210 is shown as a straight line merely for purposes of illustration. It is more likely that the first travel segment 210 is a non-linear route and may include one or more expressways, highways, and/or streets.

One or more devices such as the smartphone 126 carried by the driver 125, the smartphone 116 carried by the first passenger 115, and/or the auxiliary operations computer 110, may determine that there is a traffic delay on the first travel segment 210. This information may be obtained from various sources, such as, for example, a server computer operated by a traffic control agency, when the vehicle 100 approaches the intermediate location 215. The traffic delay may be caused due to various reasons such as, for example, an accident, or due to traffic congestion. The driver 125 and/or the first passenger 115 may decide at this time that it is inadvisable to continue traveling in the vehicle 100 beyond the intermediate location 215. In this scenario, the driver 125 and/or the first passenger 115 determine the spot along the travel route that constitutes the intermediate location 215.

In another scenario, the intermediate location 215 may be determined on the basis of a geofence 226 that defines a car-free zone 227. The vehicle 100 is not allowed to travel inside the geofence 226. Consequently, the driver 125 and/or the auxiliary operations computer 110 may make the determination about the spot along the travel route that constitutes the intermediate location 215.

In yet another scenario, the first passenger 115 may submit a request through the application in the smartphone 116 to indicate that he/she does not wish to continue travelling in the vehicle 100 beyond the intermediate location 215. In this scenario, the first passenger 115 determines the spot along the travel route that constitutes the intermediate location 215.

The intermediate location 215 may also be determined based on various factors, such as, for example, a distance 230 between the intermediate location 215 and the trip destination 225. In one exemplary case, the distance 230 between the intermediate location 215 and the trip destination 225 may be determined on the basis of a capability of a secondary vehicle, such as the secondary vehicle 140 and/or on a capability of the first passenger 115 to operate the secondary vehicle 140.

For example, when the secondary vehicle 140 is a bicycle, the distance 230 may be determined based on factors such as how far the bicycle can be used for travel, the nature of the second travel segment 220 (cycle paths, traffic density, pedestrian density, etc.), and/or a physical condition of the first passenger 115 to operate the bicycle.

The vehicle 100 is stopped at the intermediate location 215, either by the driver 125 (when the vehicle is operated by the driver 125) or by the vehicle computer 105 (when the vehicle is an autonomous vehicle). After stopping at the intermediate location 215, the driver 125 of the vehicle 100 may advise one or more passengers that they can make use of the secondary vehicle 140 to travel from the intermediate location 215 to the trip destination 225. This operation may be performed, for example, by sending a message to the smartphone 116 of the first passenger 115. The message may advise the first passenger 115 to use the application in the smartphone 116 for using the secondary vehicle 140 to travel from the intermediate location 215 to the trip destination 225.

The vehicle 100 may continue to travel from the intermediate location 215 to other locations after the first passenger 115 has exited the vehicle 100. When the vehicle 100 is a ride-share vehicle, the other locations may be specified by other passengers in the vehicle 100. The two-segment approach described above may be used during travel to one or more of these other locations.

Figure 3:
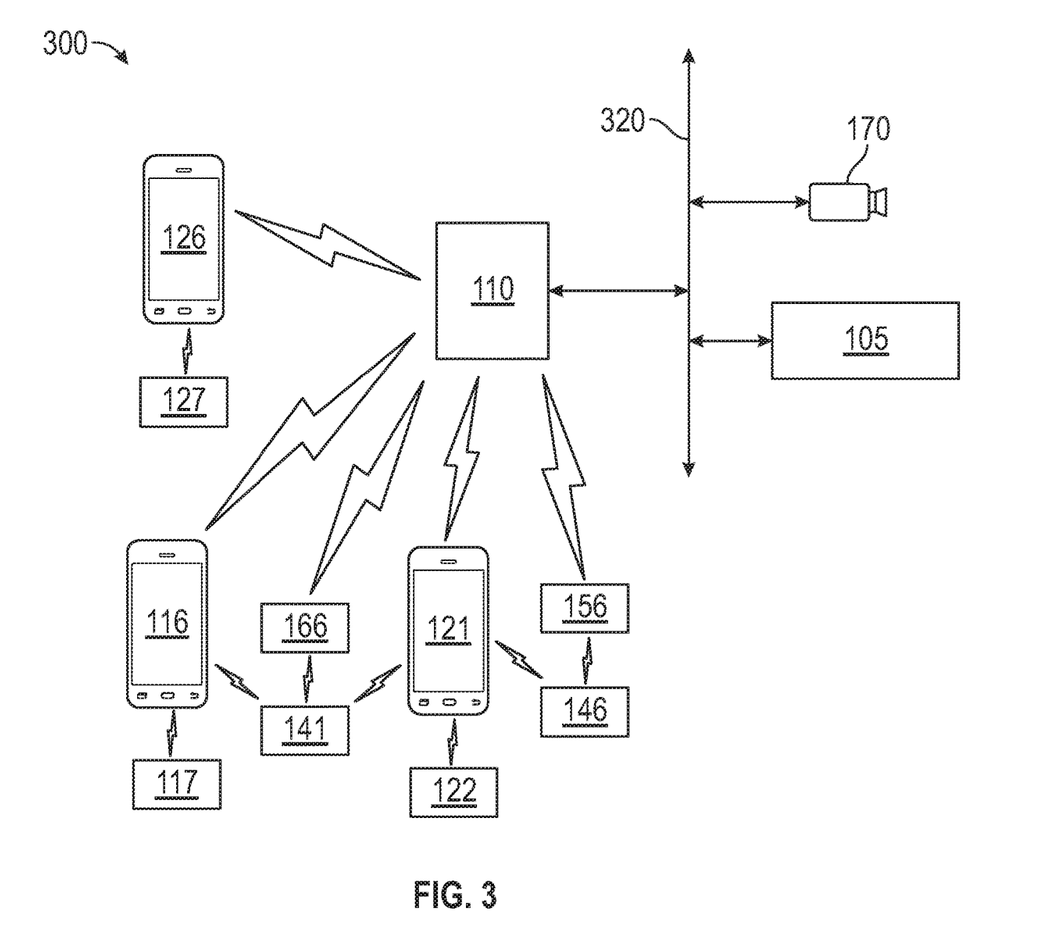
FIG. 3 shows some exemplary communication devices configured to provide unified transportation service in accordance with an embodiment of the disclosure.

FIG. 3 shows an exemplary system 300 for providing a unified transportation service in accordance with an embodiment of the disclosure. The exemplary system 300 includes the auxiliary operations computer 110, which operates as a master control element that supervises and executes various operations in cooperation with the various smartphones and other devices in the vehicle 100. In another exemplary system embodiment, the smartphone 126 that is carried by the driver 125 may be configured as the master control element, particularly when the vehicle 100 does not include a computer such as the auxiliary operations computer 110 for performing operations in accordance with the disclosure.

The various communication devices present in the vehicle 100 may interact with each other wirelessly using one or more of various types of wireless communication formats and/or by using technologies such as barcode technology and near-field communication (NFC) technology. Some exemplary wireless communication formats can include Bluetooth®, ZigBee®, cellular, Wi-Fi, Wi-Fi direct, machine-to-machine wireless communication, and man-to-machine wireless communication.

For example, the smartphone 126 carried by the driver 125 of the vehicle 100 may use Wi-Fi to communicate with the auxiliary operations computer 110 for transferring information in the form of messages, signals, and/or data. The smartphone 126 may use Bluetooth® for pairing with the communication tag 127 that is attached to the seat 128 of the driver 125. The smartphone 126 may use cellular, Wi-Fi, or Bluetooth® for communicating, and/or pairing, with the smartphone 116 of the first passenger 115 and/or the smartphone 121 of the second passenger 120.

As another example, the smartphone 116 of the first passenger 115 may use Bluetooth® for pairing with the communication tag 117 that is attached to the seat 118 occupied by the first passenger 115. The smartphone 116 may also use Bluetooth® to pair with an identification tag of an assigned secondary vehicle such as, for example, the identification tag 141 that is attached to the secondary vehicle 140 or the identification tag 146 that is attached to the secondary vehicle 145. The smartphone 116 may use Wi-Fi to communicate with the auxiliary operations computer 110, the communication device 156, and/or the communication device 166.

As yet another example, the communication device 166 may use Bluetooth® to pair with the identification tag 141 that is attached to the secondary vehicle 140 and Wi-Fi to communicate with the auxiliary operations computer 110.

The auxiliary operations computer 110 may not only communicate wirelessly with various communication devices present in the vehicle 100 but may also use a bus 320 to communicate with other devices such as the vehicle computer 105 and the imaging device 170 that are mounted in the vehicle 100. The bus 320 can be implemented using one or more of various wired and/or wireless technologies. For example, the bus 320 can be a vehicle bus that uses a controller area network (CAN) bus protocol, a Media Oriented Systems Transport (MOST) bus protocol, and/or a CAN flexible data (CAN-FD) bus protocol. Some or all portions of the bus 320 may also be implemented using wireless technologies such as Bluetooth®, ZigBee®, or near-field-communications (NFC), cellular, Wi-Fi, Wi-Fi direct, machine-to-machine communication, and/or man-to-machine communication to accommodate communications between various elements of the system 300.

Figure 4:
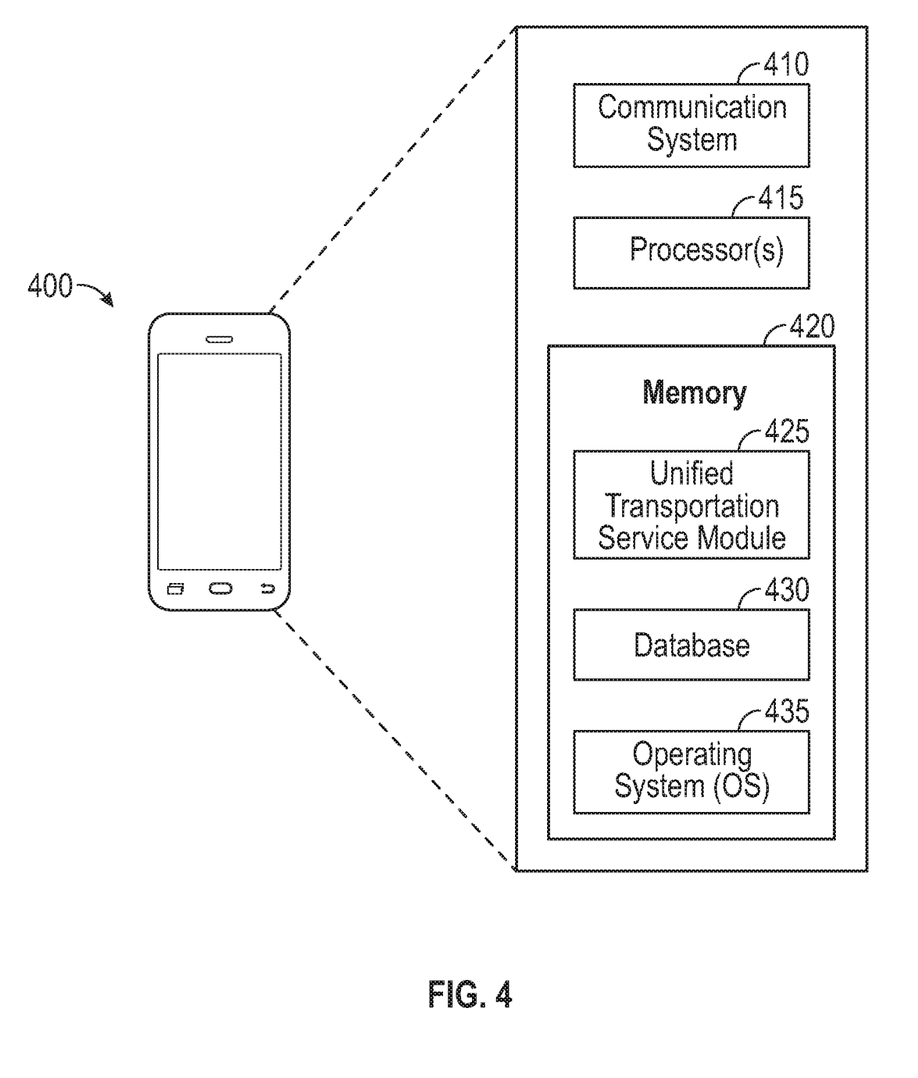
FIG. 4 illustrates some exemplary components that may be included in a communication device used for performing certain operations in accordance with the disclosure.

FIG. 4 illustrates some exemplary components that may be included in a communication device 400 used for performing certain operations in accordance with the disclosure. The communication device 400 can be any of the various devices described in this disclosure such as, for example, the smartphone 126 carried by the driver 125, the smartphone 116 carried by the first passenger 115, or the smartphone 121 carried by the second passenger 120.

In the exemplary implementation shown in FIG. 4, the communication device 400 includes a communication system 410, a processor 415, and a memory 420. The communication system 410 can include one or more wireless transceivers that allow the communication device 400 to communicate with various other devices in the vehicle 100.

The memory 420, which is one example of a non-transitory computer-readable medium, may be used to store an operating system (OS) 435, a database 430, and code modules such as a unified transportation service module 425. The code modules are provided in the form of computer-executable instructions that can be executed by the processor 415 for performing various operations in accordance with the disclosure. In an exemplary embodiment, the unified transportation service module 425 is provided in the form of an application that may be downloaded into the communication device 400 from a server computer (not shown).

The unified transportation service module 425 can be executed by the processor 415 for performing various operations in accordance with the disclosure. The operations can include, for example, determining an estimated time of travel to the trip destination 225, obtaining traffic data, identifying passengers by using the smartphones carried by the passengers, determining trip destinations for multiple passenger in the vehicle 100, and sending an advice notification to the smartphone 126 of the driver 125 to advice the driver to inform the passengers about the intermediate location 215 and the use of the secondary vehicles.

The database 430 can be used to store various types of information such as, for example, information regarding assignment of a secondary vehicle, destination information, and intermediate location information.

Figure 5:
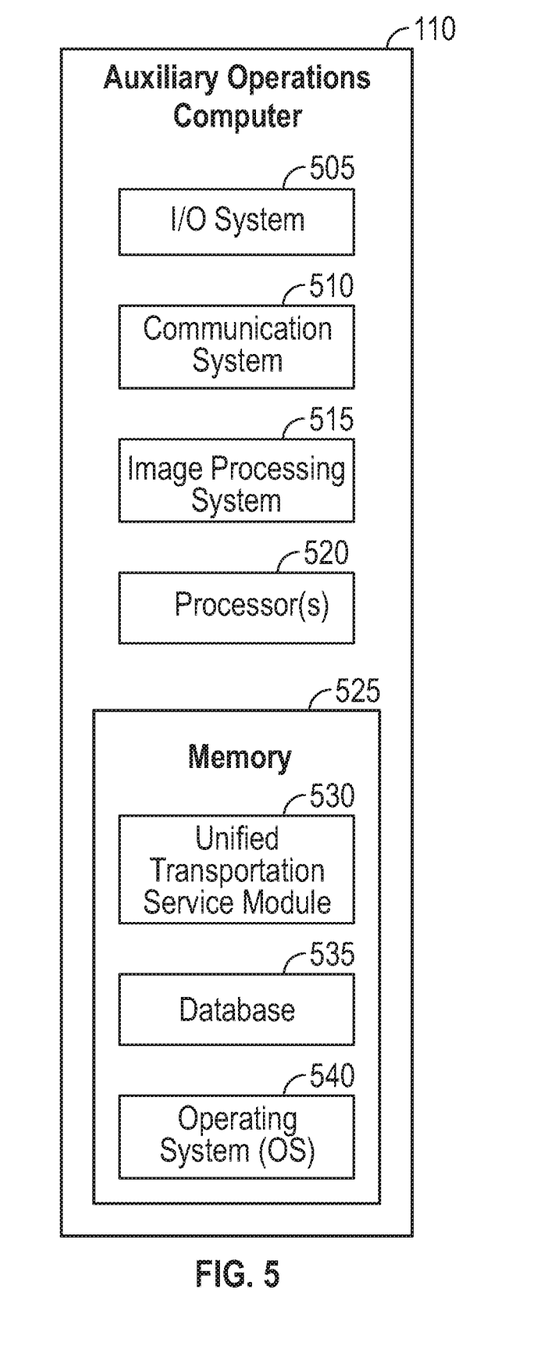
FIG. 5 illustrates some exemplary components that may be included in an auxiliary operations computer provided in a vehicle configured for performing certain operations in accordance with the disclosure.

FIG. 5 illustrates some exemplary components that may be included in the auxiliary operations computer 110 for performing certain operations in accordance with the disclosure. Some or all of the components of the communication device 400, such as the communication system 410 and the memory 420 can be incorporated into the auxiliary operations computer 110. These components are identified in FIG. 5 as the communication system 510 and the memory 525. At least some portions of the communication system 510 can include a Bluetooth® Low Energy Module (BLEM) for allowing the auxiliary operations computer 110 to communicate via Bluetooth® with other devices.

The memory 525, which is another example of a non-transitory computer-readable medium, may be used to store an operating system (OS) 540, a database 535, and code modules such as a unified transportation service module 530. The unified transportation service module 530 that is contained in the memory 525 can be executed by the processor 520 for carrying out certain operations that may be different than those carried out by execution of the unified transportation service module 425 by the processor 415. For example, the unified transportation service module 530 can be executed by the processor 520 for inventory management of the secondary vehicles and for supervising various operations associated with the use of the secondary vehicles by passengers of the vehicle 100.

In an exemplary implementation, the unified transportation service module 530 is activated only when one or more passengers are present in the vehicle 100. The unified transportation service module 530 can be executed for carrying out various operations in accordance with the disclosure. The operations can include, for example, managing passenger IDs based on, for example, pairing of the smartphones carried by the passengers with the communication tags attached to the seats of the vehicle 100, communicating with a remote server computer to update the server computer of the trip details and other data, determining an estimated time of travel to the trip destination 225, obtaining traffic data, identifying passengers by using the smartphones carried by the passengers, determining trip destinations for multiple passenger in the vehicle 100, and send an advice notification to the smartphone 126 of the driver 125 to advice the driver to inform the passengers about the intermediate location 215 and the use of the secondary vehicles.

The auxiliary operations computer 110 may also include elements such as an image processing system 515 and an input/output (I/O) system 505. The image processing system 515 may be used to process images received by the auxiliary operations computer 110 from the imaging device 170. The input/output (I/O) system 505 enables the auxiliary operations computer 110 to exchange signals with the vehicle computer 105 for carrying out operations such as stopping the vehicle 100 at the intermediate location 215, and also for obtaining location information about the vehicle 100. The location information may be obtained from a GPS system that is provided in the auxiliary operations computer 110 and/or is accessible by the auxiliary operations computer 110 via the I/O system 505.

Figure 6:
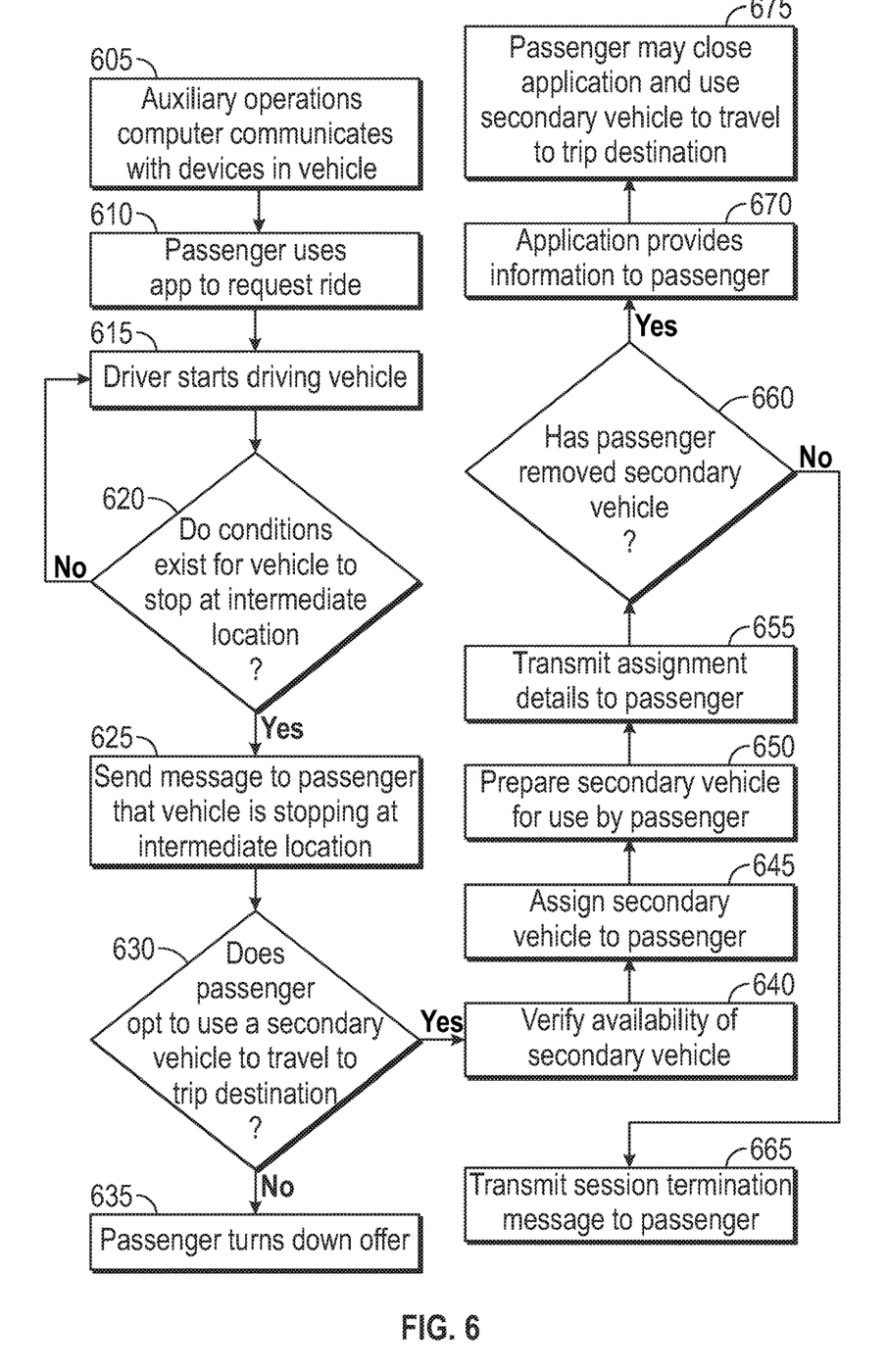
FIG. 6 shows an exemplary flowchart of a method of operation of a unified transportation service in accordance with an embodiment of the disclosure.

FIG. 6 shows an exemplary flowchart 600 of a method of operation of a unified transportation service in accordance with an embodiment of the disclosure. The flowchart 600 illustrates a sequence of operations that can be implemented in hardware, software, or a combination thereof. In the context of software, the operations represent computer-executable instructions stored on one or more non-transitory computer-readable media such as the memory 420 and the memory 525, which, when executed by one or more processors such as the processor 415 and the processor 520 perform the recited operations. More particularly, some or all of the computer-executable instructions can be embodied in the form of the unified transportation service module 425 and the unified transportation service module 530 described herein.

Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. The various objects that are included in FIGS. 1 through 5 are used below for purposes of description. However, it must be understood that the description is equally applicable to other objects in various other embodiments. Also, various references made with respect to the first passenger 115 are equally applicable to the second passenger 120 and must be understood as such.

At block 605, the auxiliary operations computer 110 may communicate with and/or pair with one or more communication devices in the vehicle 100, such as, for example, the smartphone 126 carried by the driver 125 of the vehicle 100, the smartphone 116 carried by the first passenger 115, and/or the smartphone 121 carried by the second passenger 120. The communication/pairing operation provides information to the auxiliary operations computer 110 pertaining to the occupancy of the vehicle, such as whether the driver is available to drive the vehicle 100 and a head count of the number of passengers present in the vehicle 100.

The auxiliary operations computer 110 may also communicate with the imaging device 170 for receiving images of the storage area 130. These images can be processed by the auxiliary operations computer 110 for various reasons such as to maintain an inventory of the secondary vehicles. Information provided by the inventory may include items such as the number of secondary vehicles available for use, the number of secondary vehicles that have been assigned to one or more passengers of the vehicle 100, the number of secondary vehicles that have been removed from the vehicle 100, and the number of secondary vehicles that are unavailable for use.

At block 610, a passenger of the vehicle 100, such as, for example, the first passenger 115, may use the application in the smartphone 116 to enter a request for a ride in the vehicle 100. The ride request may include the trip destination 225. This information may be communicated from the smartphone 116 to the smartphone 126 carried by the driver 125 and/or the auxiliary operations computer 110.

At block 615, the driver 125 starts driving the vehicle 100 towards the trip destination 225. A GPS system provided in the smartphone 126 carried by the driver 125 and/or in the auxiliary operations computer 110 may be used to track the movement of the vehicle 100 along the first travel segment 210 (shown in FIG. 2). The smartphone 126 and/or the auxiliary operations computer 110 may also obtain traffic information from various sources such as a server computer of a traffic monitoring service or via the GPS system. The traffic information can predict whether a travel delay will occur as a result of various factors such as traffic density, traffic congestion, or a traffic accident.

The smartphone 126 and/or the auxiliary operations computer 110 may use this information in conjunction with other factors to determine the intermediate location 215. Other factors can include, for example, information about the geofence 226 and whether the first passenger 115 has entered a request into the application for exiting the vehicle 100 at the intermediate location 215. The first passenger 115 may make the request based on his/her personal considerations such as, for example, anxiousness to reach the trip destination 225 within a certain time period, and/or restlessness when the vehicle 100 has stopped for an extended period of time due to road conditions (traffic congestion, traffic accident, etc.).

At block 620, a determination is made whether various factors warrant the vehicle 100 being stopped at the intermediate location 215. The various factors may be based on parameters such as traffic information, availability of secondary vehicles, demand for use of the secondary vehicles by the passengers of the vehicle 100, and a distance between a current location of the vehicle 100 and the trip destination 225. For example, the auxiliary operations computer 110 may make a determination not to stop at the intermediate location 215 because of factors such as the distance between a current location of the vehicle 100 and the trip destination 225 being small (or too far) to inconvenience the passengers with use of the secondary vehicles; because the traffic density is not very high; and/or because the travel time to the trip destination 225 is acceptable to the passengers. In such cases, the second travel segment 220 may be eliminated and the vehicle proceeds to the trip destination 225. The secondary vehicles may be dispensed at the trip destination 225 and used by one or more passengers if so desired. If used, a travel path traveled by a passenger from the trip destination 225 may be considered as the second travel segment.

The intermediate location 215 may be determined by the smartphone 126 and/or the auxiliary operations computer 110 at any spot along the travel route between the starting location 205 and the trip destination 225. In one exemplary scenario, the traffic density and delay may be low enough that the vehicle 100 reaches a location that is about one block away from the trip destination 225. A decision may be made by the smartphone 126 and/or the auxiliary operations computer 110 whether this location constitutes the intermediate location 215. In another exemplary scenario, the traffic density and delay may be very high and the vehicle 100 can only reach a location that is about three blocks away from the trip destination 225. A decision is made by the smartphone 126 and/or the auxiliary operations computer 110 that this location constitutes the intermediate location 215. In yet another exemplary scenario, the intermediate location 215 may be a predefined location such as a location that corresponds to the geofence 226. In this scenario, the smartphone 126 and/or the auxiliary operations computer 110 do not use the various factors such as traffic delays and traffic density to identify the intermediate location 215.

If at block 620, the smartphone 126 and/or the auxiliary operations computer 110 determine that the intermediate location 215 has not yet been reached, the driver 125 continues to drive the vehicle 100 along the first travel segment 210. On the other hand, if the smartphone 126 and/or the auxiliary operations computer 110 determine that the intermediate location 215 has been reached, at block 625, a message may be sent by the smartphone 126 and/or the auxiliary operations computer 110 to the smartphone 116 of the first passenger 115 to indicate that the vehicle 100 is being stopped at the intermediate location 215. The message may further provide the first passenger 115 an option to use one of the secondary vehicles to travel to the trip destination 225.

At block 630, a determination may be made whether the first passenger 115 has accepted to use a secondary vehicle. If the first passenger 115 has turned down the offer for use of a secondary vehicle, at block 635, the lack of acceptance may be noted in one or more devices such as the smartphone 116 carried by the first passenger 115, the smartphone 126 carried by the driver 125, and the auxiliary operations computer 110. The auxiliary operations computer 110 may use this information as a part of the inventory operations, such as, for example, with respect to availability of the secondary vehicles.

The first passenger 115 may accept the use of a secondary vehicle, for example, by making his decision known via the application in the smartphone 116. At block 640, the smartphone 126 and/or the auxiliary operations computer 110 may use the database 535 to verify an availability of a secondary vehicle and assign one of the secondary vehicles to the first passenger 115 (for example, the secondary vehicle 140). At block 645, the first passenger 115 is informed of the assignment via the application in the smartphone 116.

At block 650, the auxiliary operations computer 110 may execute various operations such as, for example, communicating with the communication device 166 provided on the dock 155 to inform the communication device 166 that the secondary vehicle 140 has been assigned to the first passenger 115. The communication device 166 may respond to the information by ensuring that the secondary vehicle 140 is ready to be removed from the dock 150 and that the secondary vehicle 140 is ready for use. Checking whether ready for use may include actions such as verifying that the batteries of the secondary vehicle 140 are charged, if the secondary vehicle 140 is a battery-operated vehicle.

At block 655, the auxiliary operations computer 110 may transmit to the smartphone 116 of the first passenger 115, information pertaining to the assigning of the secondary vehicle 140. The information may include a vehicle identification (ID) of the secondary vehicle 140 (for example in the form of a digital code) and other information for identifying the secondary vehicle 140. The secondary vehicle 140 may be identified, for example, by a label or a number that is printed on a plate attached to the secondary vehicle 140. The first passenger 115 may then move to the storage area 130 of the vehicle 100 and pair the smartphone 116 with the identification tag 141 so as to validate the use of the digital code. Once validated, the first passenger 115 can remove the secondary vehicle 140 from the dock 150.

At block 660, a determination may be made whether the first passenger 115 has removed the secondary vehicle 140 from the dock 150 and/or whether the first passenger 115 has unloaded the secondary vehicle 140 from the vehicle 100. In one case, this determination may be made by using the imaging device 170 to capture an image or a video clip of the storage area 130 and processing the image or video clip in the auxiliary operations computer 110.

If the first passenger 115 has not removed the secondary vehicle 140 from the dock 150 and/or not unloaded the secondary vehicle 140 from the vehicle 100, at block 665, the application in the smartphone 116 may provide a session termination message to the first passenger 115, and terminate operations associated with the use of the secondary vehicle 140.

If the first passenger 115 has removed the secondary vehicle 140 from the dock 150 and unloaded the secondary vehicle 140 from the vehicle 100, at block 670, the application in the smartphone 116 may provide information to the first passenger 115 on how to use the secondary vehicle 140 to reach the trip destination 225. This application may be the same as the application used to request the ride in the vehicle 100 or can be a different application that is used when operating the secondary vehicle 140 (a scooter application, for example). The information provided by this application can include items such as operating instructions for the secondary vehicle 140, directions to reach the trip destination 225, and distance/time information to the trip destination 225. At block 675, the first passenger 115 may opt to close the application and use the secondary vehicle 140 to travel to the trip destination 225.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an exemplary embodiment," "exemplary implementation," etc., indicate that the embodiment or implementation described may include a particular feature, structure, or characteristic, but every embodiment or implementation may not necessarily include the particular feature, structure, or characteristic. Moreover, such phrases are not necessarily referring to the same embodiment or implementation. Further, when a particular feature, structure, or characteristic is described in connection with an embodiment or implementation, one skilled in the art will recognize such feature, structure, or characteristic in connection with other embodiments or implementations whether or not explicitly described. For example, various features, aspects, and actions described above with respect to an autonomous parking maneuver are applicable to various other autonomous maneuvers and must be interpreted accordingly.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 420 or the memory 525, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
    entering, into a first communication device, a trip destination;
    pairing the first communication device with a second communication device that is located in a primary vehicle;
    detecting, by at least the second communication device, that the primary vehicle has traveled to an intermediate location;
    determining, by an inventory management system in communication with the first communication device and the second communication device, an inventory of one or more secondary vehicles being transported in the primary vehicle;
    providing, in the first communication device, a message to indicate an availability of one of the one or more secondary vehicles that is transported in the primary vehicle for use to travel from the intermediate location to the trip destination, wherein the availability of the one of the one or more secondary vehicles is based on the inventory of the one or more secondary vehicles being transported in the primary vehicle;
    determining whether an offer to use the one of the one or more secondary vehicles has been accepted;
    removing the one of the one or more secondary vehicles from the primary vehicle;
    determining, via an imaging device, whether the one of the one or more secondary vehicles has been removed from the primary vehicle; and,
    responsive to the determination of whether the one of the one or more secondary vehicles has been removed from the primary vehicle, updating, by the inventory management system, the inventory of the one or more secondary vehicles being transported in the primary vehicle.

2. The method of claim 1, wherein the message is provided in response to a condition that provides a motivation to use the one of the one or more secondary vehicles to travel from the intermediate location to the trip destination.

3. The method of claim 2, wherein the condition that provides the motivation is one of a traffic congestion, a traffic accident, the trip destination being located in a no-vehicle zone, or a request made by a passenger of the primary vehicle.

4. The method of claim 3, wherein the first communication device is a first smartphone carried by a passenger of the primary vehicle, and the second communication device is one of a second smartphone carried by a driver of the primary vehicle or a computer mounted in the primary vehicle, the method further comprising:
    determining whether the offer to use the one of the one or more secondary vehicles has been accepted by the passenger of the primary vehicle;
    responsive to the determination that the offer to use the one of the one or more secondary vehicles has been accepted by the passenger of the primary vehicle, assigning the one of the one or more secondary vehicles to the passenger of the primary vehicle;
    pairing the first smartphone with an identification tag attached to the one of the one or more secondary vehicles, wherein the identification tag comprises a bar code or an NFC tag; and
    determining that the one of the one or more secondary vehicles has been removed from the primary vehicle at the intermediate location.

5. The method of claim 1, wherein the intermediate location is located at a predefined distance from the trip destination.

6. The method of claim 5, wherein the predefined distance is defined at least in part based on a capability of the one of the one or more secondary vehicles to transport a passenger of the primary vehicle from the intermediate location to the trip destination and a capability of the passenger of the primary vehicle to operate the secondary vehicle.

7. A method comprising:
    transporting, in a primary vehicle, one or more secondary vehicles comprising a first secondary vehicle;
    determining a condition that provides a motivation for a first passenger of the primary vehicle to use the first secondary vehicle to travel from an intermediate location to a trip destination;
    determining, by an inventory management system in communication with a first communication device of the first passenger, an inventory of the one or more secondary vehicles being transported in the primary vehicle;
    providing, in the first communication device, a first message to indicate an availability of the first secondary vehicle for use by the first passenger to travel from the intermediate location to the trip destination, wherein the availability of the first secondary vehicle is based on the inventory of the one or more secondary vehicles being transported in the primary vehicle;
    determining whether an offer to use the first secondary vehicle has been accepted;
    removing the first secondary vehicle from the primary vehicle;
    determining, via an imaging device, whether the first secondary vehicle has been removed from the primary vehicle; and,
    responsive to the determination of whether the first secondary vehicles has been removed from the primary vehicle, updating, by the inventory management system, the inventory of the one or more secondary vehicles being transported in the primary vehicle.

8. The method of claim 7, wherein the condition that provides the motivation is one of a traffic congestion, a traffic accident, or the trip destination being located in a no-vehicle zone.

9. The method of claim 8, wherein the first communication device is a first smartphone carried by the first passenger, wherein the first message is displayed on the first smartphone, and wherein the method further comprises:
entering, by the first passenger of the primary vehicle, into an application that is provided in the first smartphone, a request to travel in the primary vehicle to the trip destination; and
automatically providing, in the first smartphone, when the primary vehicle reaches the intermediate location, the first message to indicate the availability of the first secondary vehicle for use by the first passenger to travel from the intermediate location to the trip destination.

10. The method of claim 9, further comprising:
determining that the first passenger has one of accepted the offer to use the first secondary vehicle or declined the offer to use the first secondary vehicle.

11. The method of claim 10, wherein the intermediate location is located at a predefined distance from the trip destination, the predefined distance defined at least in part based on a capability of the first secondary vehicle to transport the first passenger from the intermediate location to the trip destination and a capability of the passenger of the primary vehicle to operate the secondary vehicle.

12. The method of claim 8, wherein the one or more secondary vehicles further comprise a second secondary vehicle, the method further comprising:
transporting, in the primary vehicle, the second secondary vehicle; and
providing, in a second communication device of a second passenger of the primary vehicle, a second message to indicate an availability of the second secondary vehicle for use by the second passenger to travel from the intermediate location to the trip destination.

13. The method of claim 12, wherein the first communication device is a first smartphone carried by the first passenger and the second communication device is a second smartphone carried by the second passenger, and wherein the first message is displayed on the first smartphone carried by the first passenger and the second message is displayed on the second smartphone carried by the second passenger.

14. The method of claim 13, further comprising:
determining whether the offer to use the first secondary vehicle has been accepted by the first passenger of the primary vehicle;
responsive to the determination that the offer to use the first secondary vehicle has been accepted by the first passenger of the primary vehicle, assigning the first secondary vehicle to the first passenger;
pairing the first smartphone with a first identification tag attached to the first secondary vehicle, wherein the first identification tag comprises a first bar code or a first NFC tag;
assigning the second secondary vehicle to the second passenger; and
pairing the second smartphone with a second identification tag attached to the second secondary vehicle, wherein the second identification tag comprises a second bar code or a second NFC tag.

15. A communication device comprising:
a memory that stores computer-executable instructions; and
a processor configured to access the memory and execute the computer-executable instructions to at least:
receive a travel request for transportation to a trip destination in a primary vehicle;
determine, by an inventory management system in communication with the communication device, an inventory of one or more secondary vehicles being transported in the primary vehicle;
determine a condition that provides a motivation to use one of the one or more secondary vehicles being transported in the primary vehicle to travel from an intermediate location to the trip destination;
display a message on a display screen of the communication device, the message indicating an availability of the one of the one or more secondary vehicles for use to travel from the intermediate location to the trip destination, wherein the availability of the one of the one or more secondary vehicles is based on the inventory of the one or more secondary vehicles being transported in the primary vehicle;
determine whether an offer to use the one of the one or more secondary vehicles has been accepted;
send a command to one or more vehicle devices of the one of the one or more secondary vehicles and/or the primary vehicle to configure the one of the one or more secondary vehicles for removal from the primary vehicle;
determine, via an imaging device, whether the one of the one or more secondary vehicles has been removed from the primary vehicle; and,
responsive to the determination of whether the one of the one or more secondary vehicles has been removed from the primary vehicle, update, via the inventory management system, the inventory of the one or more secondary vehicles being transported in the primary vehicle.

16. The communication device of claim 15, wherein the communication device is a smartphone, and wherein the condition that provides the motivation is one of a traffic congestion, a traffic accident, or the trip destination being located in a no-vehicle zone.

17. The communication device of claim 16, wherein the one of the one or more secondary vehicles is a personal transportation vehicle, and wherein an identification tag is attached to the personal transportation vehicle, and wherein the identification tag comprises a bar code or an NFC tag.

18. The communication device of claim 17, wherein the processor is further configured to access the memory and execute the computer-executable instructions to at least:
determine whether the offer to use the one of the one or more secondary vehicles has been accepted by a passenger of the primary vehicle;
responsive to the determination that the offer to use the one of the one or more secondary vehicles has been accepted by the passenger of the primary vehicle, assign the personal transportation vehicle to the passenger of the primary vehicle; and
pair the smartphone with the identification tag attached to the personal transportation vehicle.

19. The communication device of claim 18, wherein the intermediate location is located at a predefined distance from the trip destination, the predefined distance defined at least in part based on a capability of the personal transportation vehicle to transport the passenger from the intermediate location to the trip destination and a capability of the passenger of the primary vehicle to operate the secondary vehicle.

20. The communication device of claim 18, wherein the one of the one or more secondary vehicles is stored in a dock comprising an LED configured to provide a visual indication of one or more parameters associated with the one of the one or more secondary vehicles.

* * * * *